Patented July 26, 1949

2,476,950

UNITED STATES PATENT OFFICE 2,476,950

STABILIZED PHTHALOCYANINE TONERS
FOR PAINTS, ENAMELS, AND LACQUERS

Earl Edson Beard, Wilmington, Del., assignor to
E. I. du Pont de Nemours & Company, Wilmington, Del., a corporation of Delaware No Drawing. Application June 10, 1947,
Serial No. 753,797

4 Claims. (Cl. 106—288)

This invention relates to copper-phthalocyanine pigments for liquid pigmenting compositions, and more particularly to improved copper-phthalocyanine toners for paints, enamels and lacquers which do not display the disadvantages of crystallization or flocculation.

It is an object of the present invention to produce blue phthalocyanine pigments which may be employed in liquid pigmenting compositions without suffering from the common defects of crystal growth and flocculation. A further object is to produce such improved pigments without resort to stabilizers which affect the color value or shade of the principal color. Additional important objects of this invention will appear as the description proceeds.

Coloring matters of the phthalocyanine series, especially copper-phthalocyanine and monochloro-copper-phthalocyanine, have shades, tinctorial properties and light-fastness which would make them exceedingly valuable as pigments for paints, lacquers, printing compositions, etc. Yet, they have found relatively little commercial application in these fields today on account of a certain inherent tendency of pigments of the phthalocyanine family to segregate from the liquid vehicle. Practically all compounds of the phthalocyanine series have a strong tendency to flocculate. In the language of the paint mixer, this term refers to the tendency of the pigment to segregate from the paint or lacquer in flocculent form, except under conditions of most turbulent agitation. Such segregation naturally weakens the color of the coating composition, especially where there is a white diluent present, such as zinc white or titanium oxide.

This application is concerned primarily with coloring compositions comprising monochloro-copper-phthalocyanine as principal color, and its object is therefore to overcome the tendency to flocculate inherent in this color. According to my invention, this tendency is neatly and effectively overcome by admixing with the principal color a small quantity of a tin-phthalocyanine compound.

To explain the latter term, it will be recalled that tin has the capacity of entering into the phthalocyanine complex both as a divalent metal and as a tetravalent metal (Barrett et al., Jour. Chem. Soc., 1936, pp. 1722-3). When it enters as a divalent metal, the compound is stannous-phthalocyanine, corresponding in structure to copper-phthalocyanine or zinc-phthalocyanine (Dent et al., Jour. Chem. Soc., 1934, p. 1035). But when it enters as a tetravalent metal, the residual two valencies of the tin may be satisfied by halogen atoms, producing, for instance, dichloro-tin-phthalocyanine. Other anionic atoms or radicals may also be made to satisfy the residual valencies of the tin in lieu of chlorine, for instance bromine, fluorine, hydroxy radicals, etc., depending on the mode of preparation of the compound or on the history of subsequent treatments. The tetravalent tin atom may also span two phthalocyanine complexes, according to the scheme Pc=Sn=Pc, the compound in this instance being known as a stannic-phthalocyanine.

Now, I find that all these various forms of tin-phthalocyanine compounds, both stannous and stannic, are effective to overcome the aforenoted drawbacks in connection with liquid pigmenting compositions containing phthalocyanine compounds as the coloring material. This observation is exceedingly surprising, for there is no apparent theoretical reason for any special physical or chemical interaction between the two types of phthalocyanines, and certainly no ready explanation for the selectivity of the effect. Moreover, although dichloro-tin-phthalocyanine by itself is fugitive to light, fadeometer tests revealed no drop in tinctorial strength of the mixture, even when it contained as high as 10% by weight of the tin compound. Apparently then, the copper color in turn acts to stabilize the tin color against the action of light. Such a reciprocal cooperation and mutual protection certainly was not to be predicted on the basis of anything taught in the phthalocyanine literature.

To exert its maximum protective effect, it is naturally desirable to have the tin-phthalocyanine compound associated as intimately as possible with the particles of the copper-phthalocyanine. Such intimate association is readily obtained in the case of other auxiliary colors (incorporated for other purposes) by co-precipitation from a solvent. (See for instance Dahlen and Detrick, U. S. P. 2,192,704.) The tin-phthalocyanines, however, are not stable in sulfuric acid, the solvent that would normally be used for "acid-pasting"; coprecipitation is therefore not the best method to be applied for the purpose in question. Fortunately, I found that when the tin-phthalocyanine compound is reduced to a fine state of subdivision by the method of salt grinding (Lang and Detrick, U. S. P. 2,402,167), it may be then admixed with the finely divided principal phthalocyanine color (which in turn may have been prepared in fine state either by salt grinding or by "acid-pasting") by simply mixing the two together in any convenient manner. The two colors may be admixed in wet state or in dry form. Moreover, the two colors may be brought together for the first time by the paint mixer in the process of preparing the paint, by incorporating each in customary manner in the selected paint vehicle.

The necessary proportion of tin-phthalocyanine compound to be added differs somewhat, depending on the results sought to obtain. As a rule, addition of 1 to 5% of the tin color based on the weight of the principal color will satisfactorily protect monochloro copper-phthalocyanine against flocculation.

Without limiting this invention, the following examples will illustrate my preferred mode of operation. Parts mentioned are by weight.

Example 1

10 parts of dry table salt, 1 part of a crude, water-extracted and dried copper-phthalocyanine pigment having a chlorine content not over 6% by weight (hence, substantially monochloro-copper-phthalocyanine), and 0.05 part of dichlorotin-phthalocyanine crystals are milled together in a ball mill until full pigment strength is developed. The strength development is determined, by sampling the mixture in the mill, extracting the salt from the sample with water, and submitting the dried pigment residue to the well-known paint tests. When full strength has been developed, the product is discharged from the mill; the salt is extracted from the pigment by slurrying with water which may contain 1% to 2% by weight of HCl; the slurry is filtered, and the filter cake is washed until essentially free of acid. The pigment may be employed as press cake, or paste, or in dry form.

Example 2

10 parts of dichlorotin-phthalocyanine and 60 parts of dry table salt are milled together in a steel ball mill for 40 hours. The mixture is then slurried in water as in Example 1, and the pigment is filtered off, washed and dried.

3 parts of the color thus obtained are added to 97 parts of monochloro-copper-phthalocyanine which has previously been reduced to pigmentary form by acid pasting (i. e. dissolving in sulfuric acid, then drowning in water, filtering and drying). This pigment mixture is placed in a paint mill and thoroughly mixed in presence of a nitrocellulose vehicle. A lacquer is thus obtained which, when tested, shows superior non-flocculation properties.

Example 3

The intermediate hydrolysis product of dichlorotin-phthalocyanine which contains 5–7% chlorine by weight and is in all probability a chloro-hydroxytin-phthalocyanine is converted to finely divided form by the salt milling method described in Example 2. 2 parts of this compound and 98 parts of monochloro-copper-phthalocyanine (salt milled) are converted into a nitrocellulose lacquer in known manner. Good non-crystallizing and non-flocculating properties are observed in the lacquer thus obtained.

Example 4

10 parts of dichlorotin-phthalocyanine crystals and 40 parts of dry table salt are milled together in a steel ball mill for 60 hours. The pigment-salt mixture thus obtained is stirred in 400 parts of a 5% aqueous ammonia solution at a temperature of 90° C.–100° C. for a period of 1 hour. The hot alkaline suspension is then filtered and the filter cake is washed free of salts and ammonia.

5 parts of the dihydroxytin-phthalocyanine thus obtained and 95 parts of commercial monochloro-copper-phthalocyanine which has previously been reduced to pigmentary form by acid pasting (i. e. dissolving in sulfuric acid, then drowning in water, filtering and drying) are mixed together in dry form to produce a marketable powder. Alternatively, the aqueous pastes of these colors, before drying, may be mixed together to produce a marketable paste. Finally, the two colors may be brought together in the mentioned ratio in a paint or lacquer vehicle, such as nitrocellulose, and mixed together by grinding in usual manner. Good non-flocculating properties are observed in the paint or lacquer thus obtained.

Various intermediate hydrolysis products of dichlorotin-phthalocyanine are obtained by reducing the time or temperature (or both) in the above described process. For example, by stirring the aqueous ammonia suspension of dichlorotin-phthalocyanine for 0.5 to 1.0 hour at 40° C. to 50° C. a product is obtained which corresponds in chlorine content to a chloro-hydroxytin-phthalocyanine

Such intermediate hydrolysis products of dichlorotin-phthalocyanine serve, likewise, to inhibit the flocculating tendency of monochloro-copper-phthalocyanine in paint and lacquer vehicles.

Example 5

2 parts of the dihydroxytin-phthalocyanine, 98 parts of a relatively coarse (non-pigmentary form), dry commercial monochloro-copper-phthalocyanine, and 500 parts of dry table salt are milled together in a steel ball mill until full pigment strength is developed. After isolation as described in Example 1, the milled pigment mixture may be employed as press cake, or paste, or in dry form.

Example 6

4 parts of dihydroxytin-phthalocyanine in the form of washed filter cake (see Example 4) is thoroughly mixed with 96 parts of commercial monochloro-copper-phthalocyanine which has previously been reduced to pigmentary form by either acid-pasting or salt-milling methods as described above, and which is also in the form of a filter cake.

The mixed pigments thus obtained may be employed as the homogenized press cake, or as a dispersed paste following addition of a dispersing agent, or (after drying) in dry form.

In all the above examples the specified tin-phthalocyanine compound may be replaced, with beneficial results, by an equal weight of any of the following tin-phthalocyanine compounds, namely:

Dichlorotin-phthalocyanine ($Cl_2=Sn=Pc$),
Difluorotin-phthalocyanine,
Dibromotin-phthalocyanine,
Dihydroxytin-phthalocyanine, Chlorohydroxytin-phthalocyanine $\begin{pmatrix} Cl \\ \phantom{Cl}\diagdown \\ \phantom{Cl}\phantom{\diagdown}Sn=Pc \\ \phantom{Cl}\diagup \\ HO \end{pmatrix}$, Stannous-phthalocyanine ($Sn=Pc$),
Stannic-phthalocyanine ($Pc=Sn=Pc$),
and in fact any of the phthalocyanine compounds containing tin as the central metal and indicated in the Barrett et al., article above referred to.

The improved toner mixture of this invention may be utilized in the form of powder, press cake, paste, or pulp and may be applied to advantage for any use wherein the toner is to be diluted by a white pigment, and wherein therefore flocculation would be a serious handicap. Such uses include paints, enamels and lacquers. At the same time, their value as pure toners is not diminished, and they may be employed with equal advantage in printing ink formulations, textile pigment printing formulas, etc.

It will be clear now that my invention adapts monochloro-copper-phthalocyanine for use in paints and lacquers without the troubles of flocculation and without adding any assistants which would dilute or otherwise adversely affect the color value of the principal toner.

I am aware that other attempts have been made in the literature to combat the tendency of phthalocyanine colors to segregate in paint vehicles. Such an attempt is described in U. S. P. 2,327,472, wherein the formation of an aluminum benzoate lake of copper-phthalocyanine is recommended. In this proposal, however, the added agent or substratum has no color-value; it therefore dilutes or diminishes the tinctorial strength of the toner. My invention has the advantage that the auxiliary agent itself is a colored pigment and has in fact a shade which blends thoroughly with that of the principal toner, so that the color strength and shade of the latter are hardly affected.

In the claims below, the expression "a tin-phthalocyanine compound" shall be understood as a generic expression for the various phthalocyanine derivatives above mentioned which contain tin as the central metal, including stannous-phthalocyanine, stannic-phthalocyanine, the dihalogen tin-phthalocyanines, dihydroxytin-phthalocyanine, and all the other variations indicated in said article by Barrett et al., J. C. S., 1936, pp. 1722-3. Also by the expressions "finely divided" and "pigmentary form" I am referring to a state of division wherein the color exhibits substantially its full tinctorial strength when employed as a pigment, as for instance in a printing ink. Such state of division, as a rule, corresponds to an average pigment particle size of between 50 and 1000 millimicrons in diameter.

I claim as my invention:

1. A coloring composition consisting essentially of monochloro-copper-phthalocyanine as a principal color and a tin-phthalocyanine compound as an auxiliary color, both colors being in a finely divided form and the tin compound being intimately dispersed among the copper compound, the quantity of the tin color being at least 1% but not over 10% by weight of the said monochloro-copper-phthalocyanine compound, said coloring composition being characterized by stability against flocculation when incorporated in a liquid pigmenting composition.

2. A coloring composition consisting essentially of monochloro-copper-phthalocyanine in admixture with a quantity of dichlorotin-phthalocyanine corresponding to about 2 to 5% by weight of the monochloro-copper-phthalocyanine, the two pigments being in finely divided state and intimately dispersed among each other, and the entire coloring composition being characterized by stability against flocculation when incorporated in a liquid pigmenting composition.

3. A coloring composition consisting essentially of monochloro-copper-phthalocyanine in admixture with a quantity of chlorohydroxytin-phthalocyanine corresponding to about 2 to 5% by weight of the monochloro-copper-phthalocyanine, the two pigments being in finely divided state and intimately dispersed among each other, and the entire coloring composition being characterized by stability against flocculation when incorporated in a liquid pigmenting composition.

4. A coloring composition consisting essentially of monochloro-copper-phthalocyanine in admixture with a quantity of dihydroxytin-phthalocyanine corresponding to about 2 to 5% by weight of the monochloro-copper-phthalocyanine, the two pigments being in finely divided state and intimately dispersed among each other, and the entire coloring composition being characterized by stability against flocculation when incorporated in a liquid pigmenting composition.

EARL EDSON BEARD.

No references cited.